United States Patent Office 3,249,656
Patented May 3, 1966

3,249,656
SEALANT COMPOSITION
Lester W. Kalinowski, Park Ridge, Ill., assignor of one-half to Mathew L. Kalinowski, Chicago, Ill.
No Drawing. Filed July 30, 1963, Ser. No. 298,428
6 Claims. (Cl. 260—885)

The present invention relates to sealant compositions and more particularly to such compositions which are useful in bonding metals surface-to-surface.

It is often desirable to bond surfaces to each other in forming laminates and molded articles. Adhesive and sealant bonds can be obtained by polymerization of esters containing olefinic unsaturation. The polymerization may proceed by way of olefinic unsaturation either in the alcohol portion or the acid portion of the ester molecule. Such polymerization is commonly effected by thermal means and/or by the addition of free-radical polymerization initiators such as benzoyl peroxide, acetyl peroxide, cyclohexanone peroxide, methyl ethyl ketone peroxide, t-butyl perbenzoate, t-butyl peroxide, and the like. Tertiary organic amines are frequently employed as accelerators to obtain a faster rate of polymerization. Examples of such amines are triethyl amine, triethanol amine, dimethyl aniline, and the like. However, unsaturated ester compositions containing such catalysts and accelerators often have the disadvantage that they undergo gelation within a few hours or, at the most, within a few days, and consequently must be used shortly after they are prepared. Such compositions cannot usually be shipped for any distance or stored for any extended period of time.

Special problems are encountered where it is desired to bond metal-to-metal due to the lack of affinity of many adhesives to metal surfaces. Metal surfaces are generally non-porous and resist adherence of the adherence of the adhesive compositions. The problem is even more pronounced with machined metal surfaces. Recently it has been proposed to prepare sealant compositions for metal surfaces including an unsaturated ester monomer and an organic hydroperoxide, the latter of which is the essential catalyst in the sealant composition and is included in an amount sufficient to cause polymerization of the ester in a short period of time upon exclusion of oxygen, e.g., air, from the composition. However, because such compositions set up upon exclusion of oxygen, they are normally packaged in the presence of air to give adequate shelf life. Inclusion of air, however, wastes valuable packaging and shipping space which might otherwise be saved.

It is a general object of this invention to provide a new and useful sealant composition as herein described.

Another object is to compound a sealant composition and include therein a catalyst or catalyst system which does not cause appreciable polymerization and does not cause the sealant composition to set up even upon mere exclusion of oxygen.

Yet another object is to provide a sealant in accordance with the above objects which gives a good metal-to-metal bond and which may bond metal surfaces in preference to other surfaces.

Still another object of this invention is to provide such a sealant composition, which sets up rapidly at room temperature during use in contact with a metal surface.

Other objects and features of this invention will be apparent from the description given herein.

The sealant compositions of the present invention include an acrylic ester and a low molecular weight polymer of an allyl ester of an aromatic polycarboxylic acid, hereinafter referred to as allylic prepolymer, as components which are copolymerizable in the presence of a catalytic amount of organic amide as the essential catalyst included in the sealant composition. Co-catalysts, accelerators, inhibitors, etc. may be added as desired, although I have found that none of these are absolutely necessary to the composition.

The compositions may be conveniently prepared by mixing the acrylic monomer, pre-polymer and organic amide, preferably sufficiently to provide a generally homogeneous mixture. Usually ambient temperatures are acceptable but, if difficulty is encountered in mixing due to the viscosity of the ingredients and especially the pre-polymer, heating prior to or during mixing may be advantageous to increase the fluidity thereof. In a preferred preparation, the allylic prepolymer is added to the liquid acrylate ester with stirring at room temperature or with moderate heating. When complete solution is achieved, the organic amide catalyst is added. The co-catalyst and/or accelerator, if used, is preferably also added after complete solution is achieved.

The catalyst is an organic amide having the structural formula

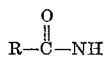

wherein R is hydrogen or an aliphatic hydrocarbon group, including open chain aliphatic and closed chain aliphatic. Although the chain size of the aliphatic group is not critical, amides of the above structure having 1 to 20 carbon atoms in the aliphatic group are preferred because of their availability or the availability of materials from which they may be produced. More specifically, the suitable amides include, but are not limited to, formamide, acetamide, propionamide, amides derived from the naturally occurring $C_{12}$–$C_{20}$ fatty acids such as palmitic, stearic, oleic, and tallow fatty acids, cyclohexyl carboxylic acid and alkyl substituted cyclohexyl carboxyl acid amides, cyclohexyl hexanoic acid amide and the like. Other usable amides are known and will be apparent to those in the art. The amide is used in the present composition in a small or catalytic amount of sufficient to catalyze copolymerization of the pre-polymer and acrylic monomer. For example, amounts of 0.1 to 10% may be used; amounts of about 2 to 5% are preferred.

The prepolymers are prepolymers, i.e., partial polymerization products, of an ester of an ethylenically unsaturated low molecular weight alcohol having a terminal vinyl group, such as allyl alcohol, 4-hydroxy-butene-1, 2-methyl-1-hydroxy-propene-1, hydroxyoctene-1, etc., and an aromatic polycarboxylic acid such as phthalic, isophthalic, terephthalic, mellitic, naphthalene dicarboxylic acids and substituted such acids. The prepolymers include, but are not limited to, prepolymers of diallyl phthalate, diallyl isophthalate, triallyl trimellitate, and di-allyl trimellitate.

The preferred prepolymers are low molecular weight normally liquid prepolymers, including the liquid viscous and semi-solid or solid prepolymers, of allytic esters having the formula

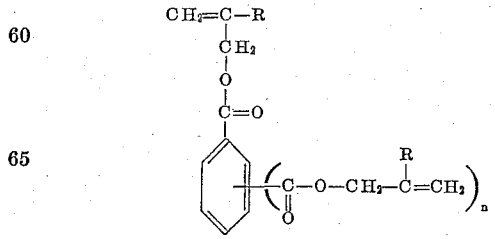

wherein R is H or $CH_3$ and $n$ is 1 to 2 inclusive, which may be prepared by the controlled polymerization of such allylic ester using techniques well known to those in the art. More examples of suitable prepolymers and techniques for their preparation are disclosed, for example, by Irving E. Muskat in U.S. Patent 2,377,095, entitled, "Polymerization of Phthalate Derivatives," and patented May 29, 1945. The usable prepolymers are advantageously soluble in the acrylic monomer.

A useful prepolymer can be prepared from, for example, diallyl phthalate in the following manner: A 50% solution of diallyl phthalate in xylene is heated under reflux with 0.1% by weight of benzoyl peroxide for eight hours. The reaction mixture is cooled and poured with stirring into a large excess of methanol to precipitate the prepolymer. The precipitate is washed with methanol, dried, and is obtained in the form of a white, free-flowing powder. The prepolymer thus obtained has a softening point of 110° C. By varying the reaction time and temperature, prepolymers having softening points between about 50° C. and 200° C. and completely soluble in the esters described above can be prepared. Control should be exercised, however, to avoid high temperatures and prolonged heating which lead to the formation of infusible and insoluble polymers, as will be evident to those in the art.

A particularly useful prepolymer prepared from diallyl phthalate has the following physical properties:

| | |
|---|---|
| Bulk density, lbs./cu. ft. | 14–16 |
| Sp. gr. at 25° C. | 1.267 |
| Iodine No. | 57 |
| Softening range, ° C. | 85–115 |

A prepolymer having the above properties can be obtained under the name "Dapon 35" from Food Machinery Corporation.

The acrylic monomer is an ester of an acrylic acid or substituted acrylic acid, such as hydrocarbon and/or halogen substituted such acid, and a polyhydric alcohol. Such esters are well known and the examples below are given merely as a guide to those in the art, it being understood that a variety of such esters may be used as will be recognized by those in the art. Examples include ethylene glycol dimethacrylate, diethylene glycol dimethacrylate, triethylene glycol dimethacrylate, tetraethylene glycol dimethacrylate, polyethylene glycol dimethacrylate, dipropylene glycol dimethacrylate, tetraethylene glycol diacrylate, tetraethylene glycol dichloracrylate, glycerol trimethacrylate, and pentaerythritol tetramethacrylate. The esters may be used singly or in combination and need not be highly purified. Commercial grades of the esters are entirely satisfactory.

The preferred acrylic monomers are the normally liquid poly-esters, including di-, tri-, tetra-, etc., esters, of an acrylic acid and a polyhydric alcohol in which the acrylic acid has the formula $CH_2=C(R)—COOH$, where R is a group selected from the class consisting of hydrogen, lower alkyl (especially methyl), and halogen (especially chlorine) and the polyhydric alcohol is an open chain polyol, such as one having the formula $R(OH)_x$ wherein $x$ is at least 2 and preferably 2 to 4 and R is an alkyl or alkoxy group. Such polyols include, but are not limited to, the di-, tri- and tetra-methylol hydrocarbons and the ethylene oxide, propylene oxide, butylene oxide and other higher alkylene oxide condensation products, e.g., the ethylene oxide condensation products of the formula $HO—CH_2CH_2(OCH_2CH_2)_mOH$ where $m$ has a value of 0 to about 10 inclusive. Such esters include, for example, the poly-esters of acrylic, methacrylic or chloroacrylic acids and glycerol, trimethylol propane, trimethylol methane, pentaerythritol, etc.

If desired, co-catalysts that do not impair the preferential curing and storage stability characteristics of the composition may be added in small amounts. The co-catalyst may be one which per se does not impair such stability or may be used in such small amounts as to have no appreciable effect on stability. Suitable co-catalysts are the organic hydroperoxides, for example, cumene hydroperoxide, t-butyl hydroperoxide, menthane hydroperoxide, and the like. Accelerators such as those of the tertiary organic amine type may also be added in small amounts, if desired, as may inhibitors or other ingredients which do not detract materially from the bonding or sealing ability of the composition.

In an advantageous form of the sealant composition, the prepolymer is present in solution in the acrylic monomer. Preferably the acrylic monomer is used in a major amount and the prepolymer in a lesser or minor amount. For example, about 5 to 60% or more or less, and preferably about 15 to 30% of the prepolymer may be dissolved in an acrylic ester. Solutions containing the greater amounts, e.g., 25 to 40% of prepolymer may be viscous and are useful where a bond is to be formed on vertical surfaces or between surfaces that have relatively large clearances. Solutions containing the lesser amounts, e.g., 5 to 20% of the prepolymer may be highly fluid and readily penetrate into small clearances such as those found between threaded connections and other closely fitting parts.

The following are examples of compositions of the present invention and are not intended as limitations on the invention:

Example I

Fifteen percent by weight of diallyl phthalate prepolymer (Dapon 35) having a softening range of 85–115° C., was added to tetraethylene glycol dimethacrylate and the mixture was warmed slightly above room temperature until the prepolymer was dissolved. Five percent by weight formamide was then added.

For purposes of comparison with the sealant composition of Example I, the following preparations were formulated:

*Preparation 1.*—5% formamide in tetraethylene glycol dimethacrylate.

*Preparation 2.*—5% formamide in commercial grade diallyl phthalate monomer.

*Preparation 3.*—5% formamide in a solution of 15% of the diallyl phthalate prepolymer of Example I in diallyl phthalate monomer as solvent.

The activity of each of the compositions above (Example I and Preparations 1 through 3) as a sealant was tested by the following procedure:

Two drops of the composition are placed in the mating threads of a ⅜ inch medium-carbon steel nut and bolt having 24 threads per inch, and are allowed to set and cure at room temperature (75° F.) The time is noted for the composition to develop a finger-tight set of the nut. Also noted is the prevailing torque developed by the sealant bond at various time periods up to 24 hours. Prevailing torque is defined as the average of the torque values required to turn the nut ¼ turn and ½ turn.

The following table shows the curing properties of the compositions of Example I and Preparations 1–3.

TABLE I

| Sealant Composition | Time to Finger-Tight Set | Prevailing Torque, Ft. Lbs. | |
|---|---|---|---|
| | | 1 Hr. | 12 Hrs. |
| Example I | 25 minutes | 6 | 10 |
| Preparation 1 | Greater than 24 hrs. | 0 | 0 |
| Preparation 2 | ----do---- | 0 | 0 |
| Preparation 3 | ----do---- | 0 | 0 |

Thus, although the amide catalyst system was used in an attempt to set up individually an acrylic monomer and a prepolymer in separate runs (Preparations 1 and 3) and was also used in combination with the di-allyl phthalate monomer (Preparation 2), the system was effective only with the mixture of acrylic monomer and prepolymer (Example I), when each of the mixtures was brought into contact with ferrous metal surfaces to seal metal-tometal. The sealant test above was repeated for each of the four compositions substituting nuts and bolts made of brass and made of aluminum as well as cadmium and zinc plate nuts and bolts and the same general results were obtained, the composition of Example I acting as a good sealant while the compositions of Preparations 1 through 3 were generally ineffective.

*Example II*

In accordance with the procedure of Example I, 15% of the di-allyl phthalate prepolymer was added to a mixture of equal parts of tetraethylene glycol di-methacrylate and ethylene glycol di-methacrylate and dissolved. 5% of formamide was added.

*Example III*

The preparation of Example II was repeated substituting 5% acetamide for the formamide.

*Example IV*

To a solution of 30% of diallyl isophthalate prepolymer in tetraethylene glycol dimethacrylate was added 3% of formamide and 2% of t-butyl hydroperoxide.

*Example V*

To a solution of 30% of the diallyl phthalate prepolymer of Example III in tetraethylene glycol dimethacrylate was added 2½% of formamide and 1½% of cumene hydroperoxide.

*Preparation 4.*—The preparation of Example II was repeated except that 5% of acetanilide was substituted for formamide.

*Preparation 5.*—The preparation of Example II was repeated except that 5% of dimethylformamide was substituted for formamide.

*Preparation 6.*—The preparation of Example II was repeated except that 5% of benzamide was substituted for formamide.

*Preparation 7.*—In accordance with the procedure of Example I, to a solution of 30% of the diallyl phthalate prepolymer of Example I in tetraethylene glycol dimethacrylate was added 3% of cumene hydroperoxide.

The sealant test described above was repeated using the compositions of Examples II through V and Preparations 4 through 7 at 75° F. on ⅜″ medium-carbon steel nuts and bolts having 24 threads per inch. The results were as follows:

TABLE II

| Sealant Composition | Time to Finger-Tight Set | Prevailing torque after 24 hrs., Ft. Lbs. |
|---|---|---|
| Example II | 15 minutes | 12 |
| Example III | 20 minutes | 8 |
| Example IV | 20 minutes | 16 |
| Example V | 15 minutes | 18 |
| Preparation 4 | No set | 0 |
| Preparation 5 | 24 hours | 2 |
| Preparation 6 | No set | 0 |
| Preparation 7 | 12 hours | 7 |

Examples II and III, compared with Preparations 4 and 5, illustrate that the aliphatic amides are excellent catalysts for setting up the sealant compositions. Examples IV and V and Preparations 6 and 7 illustrate that although the organic hydroperoxides in small amounts alone were not of value for giving an initial fast set, such organic hydroperoxides may be used as copolymers together with the aliphatic amides if desired to provide both a fast set and a final bond of high strength.

In order to determine the storage stability of the compositions of the above examples, the compositions were subjected to the following test: the composition is placed in a polyethylene bottle and aged in an oven maintained at about 81° to 82° C. If the composition gels the time is noted. As a correlation of the test procedure with actual storage conditions, a sealant composition free from gelling after 30 minutes under the aging conditions of the test will also be free from gelling under ambient or room temperatures for at least one year. In the test, the sealant compositions of all of Examples I–V were found to be free of gelling even at the end of 90 minutes aging at which time the test was discontinued. Such results indicate excellent and highly desirable storage stability for the compositions.

In further exemplification of the invention, thirty percent by weight of Dapon 35 was dissolved in tetraethylene glycol dimethacrylate. To separate portions or aliquots of this solution was added:

*Example VI.*—2% formamide and 0.95% cumene hydroperoxide.

*Example VII.*—2% formamide and 0.95% t-butyl hydroperoxide.

*Example VIII.*—2% formamide and 0.475% cumene hydroperoxide and 0.475% t-butyl hydroperoxide.

*Preparation 8.*—0.95% cumene hydroperoxide.

*Curing properties.*—Cure on ⅜″—24 medium-carbon steel nuts and bolts at 75° F., test described above:

| Solution | Time to Finger-Tight Set | Prevailing Torque, Ft. Lbs. | | |
|---|---|---|---|---|
| | | 5 Hrs. | 14 Hrs. | 24 Hrs. |
| Example VI | 30 min | 15 | 16 | 24 |
| Example VII | 30 min | 2 | 10 | 16 |
| Example VIII | 30 min | 2 | 13 | 21 |
| Prep. 8 | No set after 24 hours | 0 | 0 | 0 |

The sealant compositions of the present invention have advantageous properties which render them useful in a wide variety of applications. In their more advantageous form, the compositions are nonvolatile liquids of high flash point and low toxicity which polymerize rapidly at room temperature, without the necessity of application of heat for curing, upon contact with metal, to an infusible insoluble solid which is characterized by high mechanical strength, toughness and resiliency. The bond is resistant to heat and to solvents such as lubricating oils, jet fuels, gasoline, alcohol, ketones, esters and other organic chemicals. Although the compositions usually set up at room or ambient temperatures, it is fully within the scope of the invention to apply heat to the sealant to accelerate the curing process.

As more specific examples of their use, the compositions of this invention may be used to seal and/or bond metal to metal, metal to glass, metal to ceramics, metal to wood, etc. A particularly useful application is in sealing or bonding threaded metal connections such as nuts and screws, stud bolts, pipe fittings and the like. The resulting bond is resistant to vibration, impact and other stresses, being resilient in nature, and its use may obviate the need for lock washers or other retaining means.

In experimentation with compositions of the present invention, there has been found that zinc and cadmium plate surfaces present less active surfaces for the curing of the sealant composition compared with such surfaces as ferrous and brass surfaces. Where such a relatively inactive surface is encountered and it is desired to lessen the time necessary for a set, a suitable primer may be applied to the surface. Metal soaps of fatty acids, e.g., applied from dilute solution in a volatile solvent, have been found effective for such priming. Priming may also be used on ferrous, brass and other normally active surfaces when an extremely fast set and cure of the composition is desired.

Useful applications for the present compositions for bonding similar or dissimilar metals are the bonding of gears to a shaft, electric motor rotors to a shaft, or similar application where closely fitted surfaces are to be bonded together. Many applications formerly requiring a force fitting of two pieces to securely join the pieces may be carried out with the present compositions, using a loose but close fit of the parts to be bonded.

It will be apparent from the above discussion that, in addition to the provision of a useful sealant composition and catalyst system, the present invention has also provided a new and useful bond in the form of a copolymer of the acrylic monomer and prepolymer. Thus, a new and useful solid and resilient copolymer composition has been provided per se. Further, laminates of a layer of the copolymer composition between members or articles having metallic surfaces have also been provided.

All percentages given herein are percentages by weight unless otherwise indicated.

The foregoing detailed description is given for clearness of understanding only and no unnecessary limitations are to be understood therefrom, as some modifications will be obvious to those skilled in the art.

I claim:
1. A liquid sealant composition which is stable for an extended period of time under room temperature storage conditions in isolation from contact with metal surfaces and comprising a mixture of a major amount of a liquid acrylic ester selected from the class consisting of di-, tri- and tetra-esters of an acrylic acid and a polyhydric alcohol, a minor amount of a low molecular weight prepolymer of an ester of a low molecular weight alcohol having a terminal vinyl group and aromatic polycarboxylic acid in solution in said acrylic ester and, as the sole operating initiator for initiating copolymerization of said acrylic ester and prepolymer, an organic amide of the formula

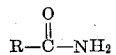

wherein R is selected from the class consisting of hydrogen and aliphatic hydrocarbon of 1–20 carbon atoms, in an amount sufficient to copolymerize said acrylic ester and prepolymer to an adherent mass on confinement of said sealant between closely facing metal surfaces of a steel bolt and steel nut at room temperature to the extent of forming a greater than finger-tight strength bond by said adherent mass between said surfaces of sufficient bond strength that appreciable torque must be applied between the nut and bolt to break said bond.

2. The sealant composition of claim 1 wherein said prepolymer is a normally solid prepolymer.

3. The sealant composition of claim 1 wherein said amide is formamide.

4. The sealant composition of claim 1 including a small amount, less than 3%, of an organic hydroperoxide, insufficient to initiate the copolymerization of said acrylic ester and prepolymer prior to initiation of said copolymerization by said organic amide, said small amount being sufficient to increase the bonding strength at 24 hours at room temperature of the resulting copolymer to a strength appreciably above the bonding strength in the absence of said hydroperoxide.

5. The composition of claim 4 wherein said organic hydroperoxide is t-butyl hydroperoxide.

6. The composition of claim 4 wherein said organic hydroperoxide is cumene hydroperoxide.

References Cited by the Examiner

UNITED STATES PATENTS

| 2,558,139 | 6/1951 | Knick et al. | 260—78.4 |
| 2,877,205 | 3/1959 | Lal | 260—885 |

FOREIGN PATENTS

| 458,647 | 8/1949 | Canada. |
| 1,258,408 | 3/1961 | France. |

References Cited by the Applicant

UNITED STATES PATENTS

| 2,435,769 | 2/1948 | Cheyney et al. |
| 2,610,168 | 9/1952 | Anderson. |
| 2,628,178 | 2/1953 | Burnett et al. |
| 2,895,950 | 7/1959 | Krieble. |

MURRAY TILLMAN, *Primary Examiner.*

J. T. GOOLKASIAN, *Assistant Examiner.*

UNITED STATES PATENT OFFICE
CERTIFICATE OF CORRECTION

Patent No. 3,249,656                                          May 3, 1966

Lester W. Kalinowski

It is hereby certified that error appears in the above numbered patent requiring correction and that the said Letters Patent should read as corrected below.

Column 2, lines 22 to 24, the formula should appear as shown below instead of as in the patent:

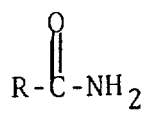

line 57, for "allytic" read -- allylic --; column 8, line 23, for "Knick et al" read -- Knock et al --; after line 37, insert the following:

| | | |
|---|---|---|
| 3,043,820 | 7/1962 | Krieble |
| 3,046,262 | 7/1962 | Krieble |
| 3,180,777 | 4/1965 | Karo |

Signed and sealed this 5th day of September 1967.

(SEAL)
Attest:

ERNEST W. SWIDER                                   EDWARD J. BRENNER
Attesting Officer                                  Commissioner of Patents